United States Patent [19]

Rogers et al.

[11] Patent Number: 5,215,122
[45] Date of Patent: Jun. 1, 1993

[54] QUICK DISCONNECT FLUID COUPLING WITH INTEGRAL PRESSURE RELIEF FEATURE

[75] Inventors: Russell L. Rogers, Munith; William C. Marrison; Alexander P. Webster, both of Jackson, all of Mich.

[73] Assignee: Aeroquip Corporation, Jackson, Mich.

[21] Appl. No.: 805,992

[22] Filed: Dec. 9, 1991

[51] Int. Cl.[5] ............................................. F16L 37/28
[52] U.S. Cl. ............................. 137/614.04; 251/149.6
[58] Field of Search ............. 137/614, 614.02, 614.03, 137/614.04, 614.05; 251/149.1, 149.3, 149.6, 149.7, 149.9

[56] References Cited

U.S. PATENT DOCUMENTS

| | | | |
|---|---|---|---|
| 3,994,317 | 11/1976 | Miyazaki | 137/614.03 |
| 4,936,345 | 6/1990 | Nix | 137/614.03 |
| 5,016,671 | 5/1991 | Barwise | 137/614.04 |
| 5,139,049 | 8/1992 | Jensen et al. | 137/614.03 X |

*Primary Examiner*—Martin P. Schwadron
*Assistant Examiner*—Kevin L. Lee

[57] ABSTRACT

A quick disconnect fluid coupling for a liquid-cooled, preprogrammed card for an aircraft communication or navigation system, the coupling being made up of male and female coupling elements which are closed to flow in the free or uncoupled state and which are open to flow when coupled. The male coupling element has an integral pressure relief feature which operates in two phases. In a first phase the male coupling element remains closed to fluid flow, but accommodates an increase in fluid pressure by movement of an annular valve sleeve within an outer annular member to increase the fluid volume within the annular member. In a second phase an end of a valve member of the male coupling element is biased away from sealing engagement with an end of the annular valve sleeve by fluid pressure, against the biasing effect of a return spring which is trapped between the annular valve sleeve and a perforate annular retainer that is affixed to an opposed end of the valve member, to permit fluid to be dumped from the coupling element.

21 Claims, 5 Drawing Sheets

QUICK DISCONNECT FLUID COUPLING WITH INTEGRAL PRESSURE RELIEF FEATURE

BACKGROUND OF THE INVENTION

This invention relates to a quick disconnect fluid coupling which is made up of mating male and female coupling elements. More particularly, this invention relates to a quick disconnect fluid coupling which is capable of relieving an increase in pressure in a fluid line which incorporates such a coupling by accommodating an increase in the volume of fluid that is retained within the coupling.

In communication and navigation systems for civilian and military aircraft, one or more removable preprogrammed cards are inserted into the system hardware to adequately instruct the hardware in accordance with the intended destination of the flight and/or the mission to be performed by the flight. During the flight a certain amount of heat is generated within each such card by virtue of the resistance heating resulting from electrical current flowing through the electrical elements on the card, and this requires that the card be cooled during its operation. Heretofore, the cooling of the card to prevent an excessive temperature buildup therein has been accomplished partly by radiation cooling and partly by circulating air or other compressible fluid through the card. Removal of heat from such a preprogrammed card by radiation and convection cooling is somewhat limited in capacity, however, and this serves as a limitation on the amount of heat which can be generated within a card to avoid the deleterious effects of excessive temperatures.

It is possible to substantially increase the thermal capacity of a preprogrammed card for an aircraft by utilizing liquid cooling to cool the card during its normal operation. It is possible to substantially increase the thermal capacity of a preprogrammed card for an aircraft by utilizing liquid cooling to cool the card during its normal operation. However, when a card is removed from the system, the pressure of the cooling liquid within the card will increase very substantially as a result of a very small increase in volume, for example, due to an increase in ambient temperature. Thus, an aircraft preprogrammed communication or navigation card should incorporate a pressure relief feature to avoid undesirable and possibly damaging or destructive pressure buildups within the card after the card has been removed from the system. Heretofore, the pressure relief function in each card, as well as the disconnected system, has been performed by a bleeding pressure relief valve located in the quick disconnect fluid coupling that is normally a feature of each card and each liquid cooling system. Previously, however, when the relief valve relieved pressure the fluid relieved would bleed to atmosphere causing liquid to be spilled on the surrounding electronic equipment and contracts.

SUMMARY OF THE INVENTION

According to the present invention there is provided a quick disconnect coupling for a liquid handling system with an integral pressure relief feature which is capable of eliminating the need for a bleeding pressure relief valve in such a liquid handling system, such as a liquid cooling system for cooling preprogrammed cards of the type used in aircraft communication and navigation systems. The coupling is made up of mating male and female coupling elements, and the male element incorporates an expansible internal chamber for a liquid to expand into when the pressure of the liquid exceeds a predetermined value. The expansion chamber is obtained by providing an annular valve body with an internal, coaxial sleeve which is spring biased into a position against a fixed shoulder where no liquid can flow, the coaxial sleeve and fixed shoulder being movably disposed in said annular valve body.

Accordingly, it is an object of the present invention to provide an improved quick disconnect coupling for a liquid handling system, and it is a corollary object of the present invention to provide male and female coupling elements of an improved quick disconnect coupling for such a liquid handling system. More particularly, it is an object of the present invention to provide a quick disconnect coupling for a liquid circulating system which incorporates an integral pressure relief feature therein, and it is a corollary object of the present invention to provide male and female coupling elements of such a quick disconnect coupling.

For a further understanding of the present invention and the objects thereof, attention is directed to the drawing and the following brief description thereof, to the detailed description of the preferred embodiment of the invention, and to the appended claims.

IN THE DRAWING

DETAILED DESCRIPTION OF THE PREFERRED EMBODIMENT

Figure 1:
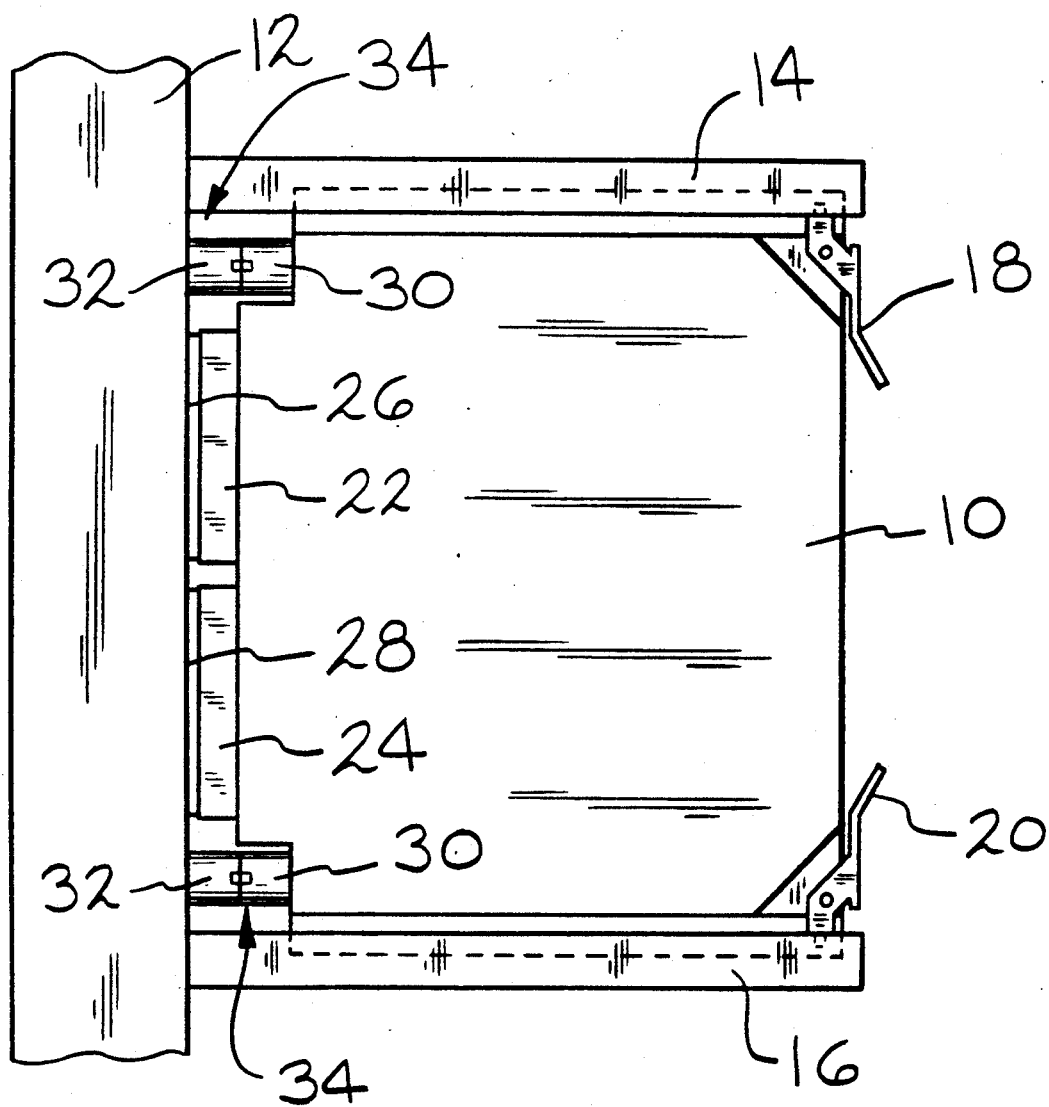
FIG. 1 is a fragmentary plan view of a preprogrammed aircraft navigation or communication card incorporating an inlet and an outlet for a liquid cooling system, each with a quick disconnect coupling in accordance with the preferred embodiment of the present invention.

As is illustrated in FIG. 1, a preprogrammed communication or navigation card 10 is detachably secured to an aircraft communication or navigation device 12, which is shown fragmentarily and schematically. The card 10 is precisely positioned from one side to another thereof by having its opposed side edges engaged in opposed tracks 14, 16 of the device 12, and by having its rear edge engaged by opposed latching devices 18, 20 which precisely position the card 10 in a front to back direction. In the position shown in FIG. 1, first and second electrical connectors 22, 24 carried by the card 10 electrically engage first and second electrical connectors 26, 28, respectively, on the device 12. The card 10 is internally liquid cooled, by means not shown, and carries spaced apart, like male coupling elements 30 which disengageably couple with spaced apart, like female coupling elements 32 on the device 12 to permit a cooling liquid, for example, water or an aqueous solution of a suitable antifreeze such as ethylene glycol, to be circulated through the card 10, and to thereby ensure proper cooling of the card 10. Each pair of the coupling elements 30 and 32, as will be and hereafter described more fully, form a quick disconnect coupling 34 in accordance with the preferred embodiment of the present invention, the quick disconnect feature of the coupling 34 being important in reducing the time involved in replacing a card 10 with a similar, but somewhat differently preprogrammed card. While not a limitation on the application of the coupling of the present invention, it is to be understood that a coupling for an aircraft navigation card is quite small, for example, approximately 9.3 mm diameter×16.7 mm mounting surface to mounting surface×33 mm overall length, when coupled.

Figure 2:
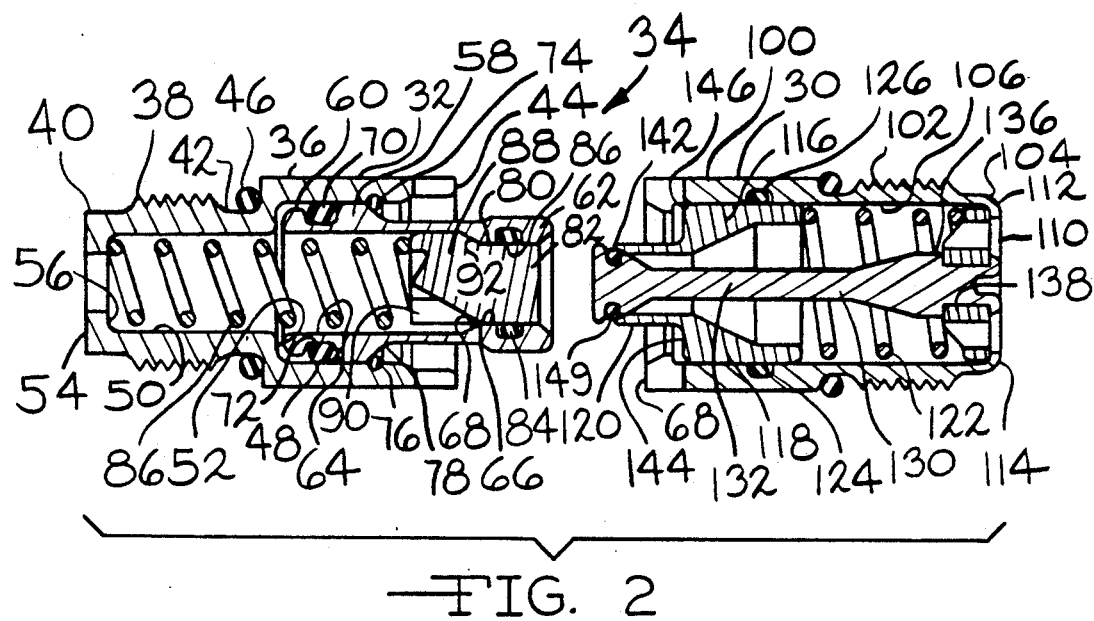
FIG. 2 is an exploded view, in cross section, of the elements of a quick disconnect coupling in accordance with the preferred embodiment of the present invention in a disassembled relationship with respect to one another.
Figure 3:
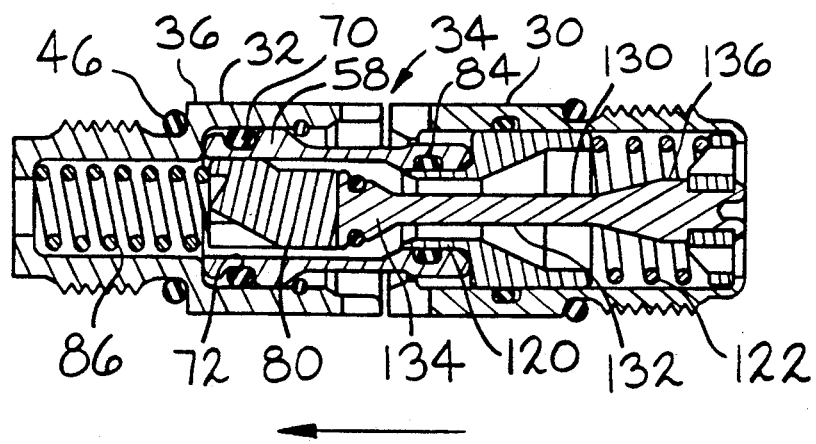
FIG. 3 is a view, similar to FIG. 2, of the quick disconnect coupling thereof with the coupling elements thereof in an assembled relationship with one another.
Figure 7:
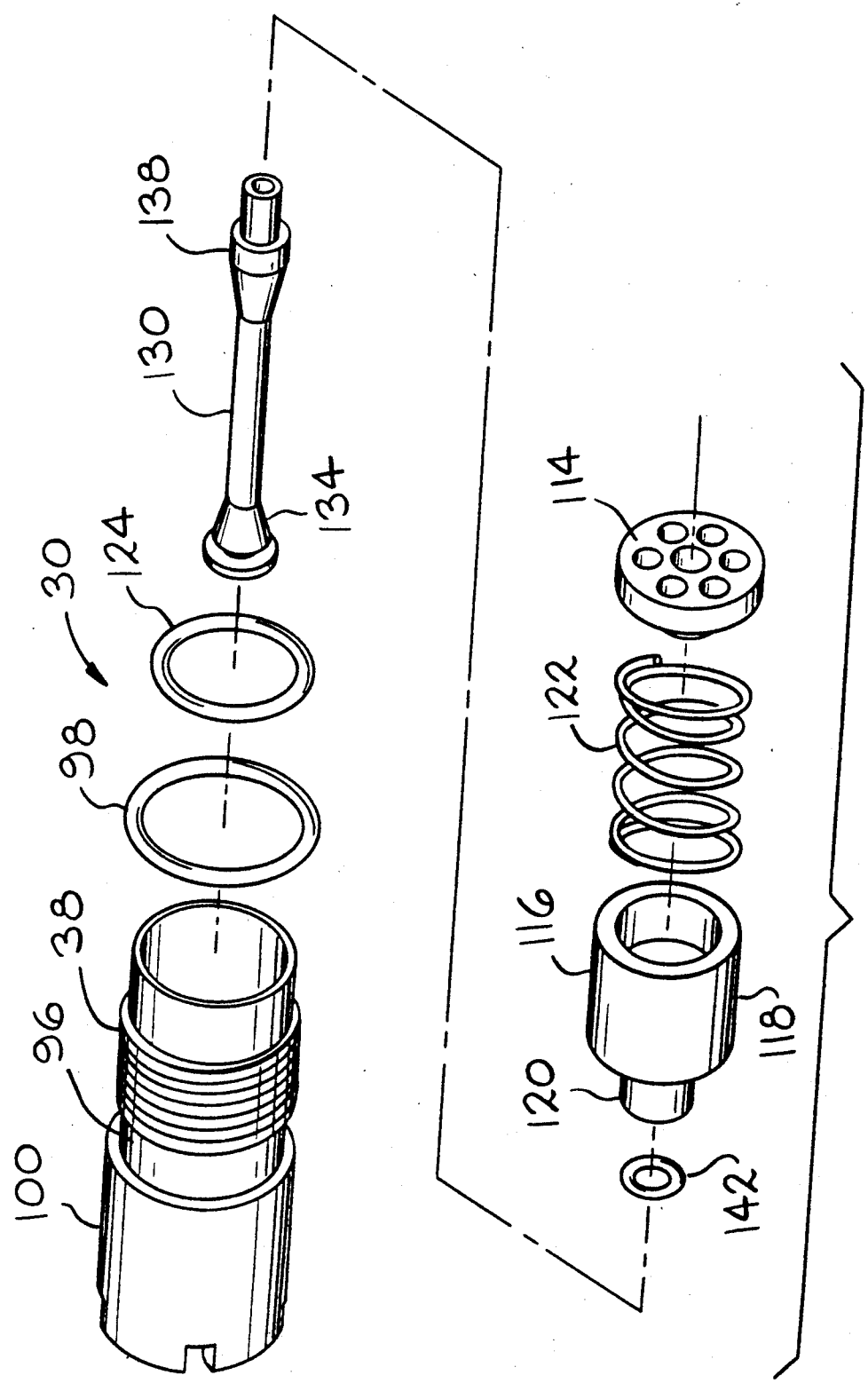
FIG. 7 is an exploded view, in perspective, of the male coupling element of the present invention.
Figure 6:
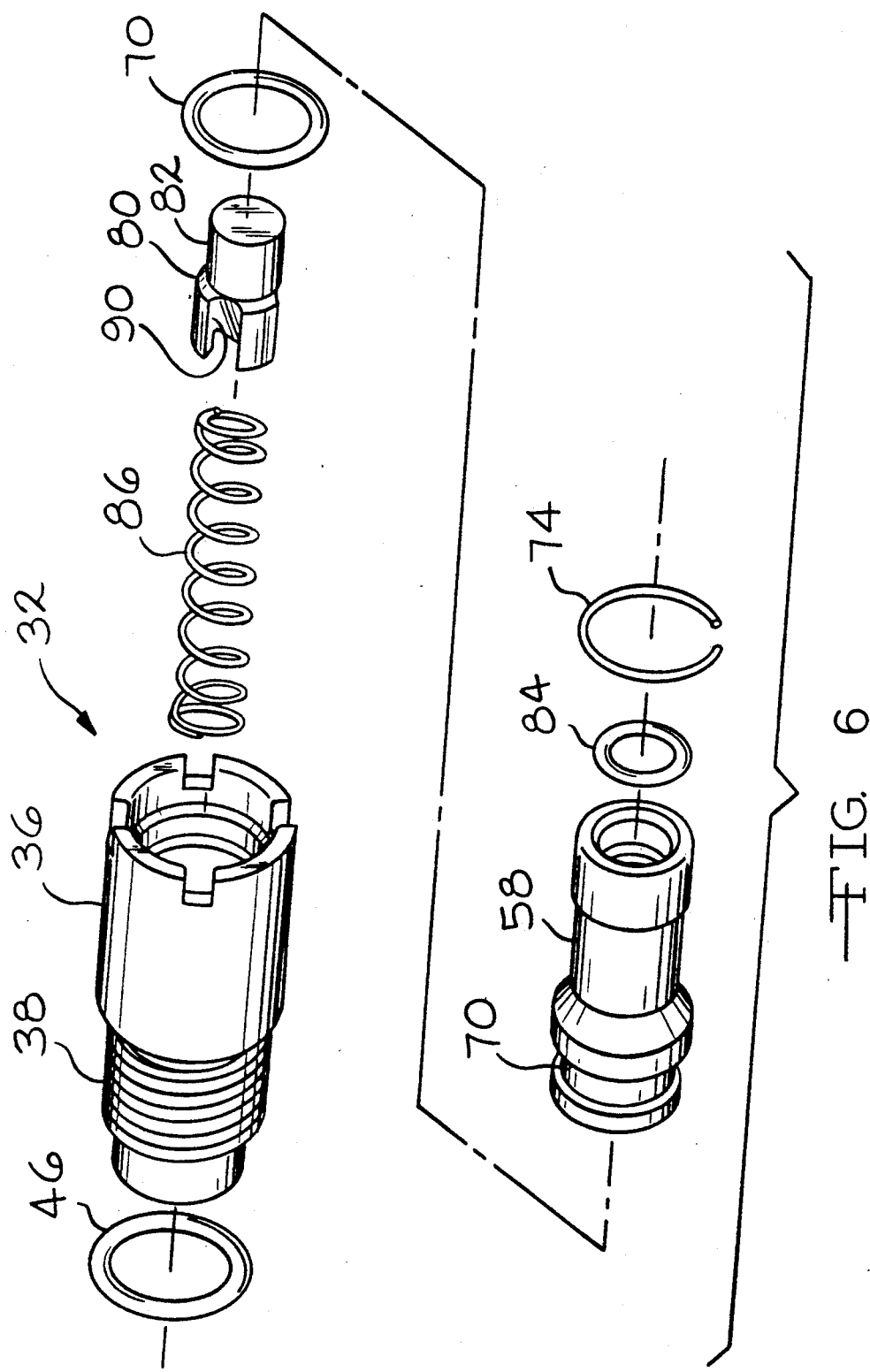
FIG. 6 is an exploded view, in perspective, of the female coupling element of the present invention.

As is shown in FIGS. 2, 3 and 6, each female coupling element 32 of a coupling 34 is made up of a metallic annular member 36 with an externally threaded portion 38 to permit an inner end 40 of the annular member 36 to be threadably secured to a fitting, not shown, within a navigation device 12. The annular member 36 further has a reduced diameter portion 42 between its end 40 and an opposed outer end 44 of the member 36, and the reduced diameter portion 42 carries a nitrile O-ring 46 to permit the annular member 36 to be sealingly inserted within a suitable opening, not shown, of the device 12.

The annular member 36 has a larger internal diameter portion 48 which extends from its outer end 44 partly towards its inner end 40, and further has a reduced internal diameter portion 50 which extends from the larger diameter portion 48 partly to the inner end 40. As shown, the larger diameter portion 48 and the smaller diameter portion 50 form an annular shoulder 52 which extends transversely of the longitudinal central axis of the annular member 36. Further, the annular member 36 has a restricted opening portion 54 extending from its inner end 40 to the smaller internal diameter portion 50, the restricted portion 54 and the smaller internal diameter portion 50 forming an annular shoulder 56 which also extends transversely of the longitudinal central axis of the annular member 36.

The female coupling element 32 also includes an annular body 58 which is slidably positioned within the larger diameter portion 48 of the annular member 36. The annular valve body 58 has an end 60 which faces toward the end 40 of the annular member 36, and which is spaced inwardly therefrom to be surrounded by the larger diameter portion 48 of the annular member 36. The annular valve body 58 further has an opposed end 62 which is positioned outwardly of the outer end 44 of the annular member 36. The annular valve body 58 has a larger internal diameter portion 64 which extends from the end 60 partly to the end 62, a smaller internal diameter portion 66 which extends from the end 62 partly to the end 60, and a frustoconically tapered surface portion 68 which is positioned between and which joins the smaller diameter portion 66 and the larger diameter portion 64. As is illustrated, for example, in FIG. 1, preferably the internal diameter of the portion 64 of the valve body 58 is substantially the same as the internal diameter portion 50 of the annular member 36 to minimize turbulence in a liquid stream flowing through the coupling element 32.

As is illustrated in FIG. 2, in the free or uncoupled state of the coupling element 32, the end 60 of the annular body 58 is spaced slightly from the shoulder 52 of the annular member 36. In the coupling of the female coupling element 32 to the male coupling element 30, the annular valve body 58 will be moved inwardly until its end 60 bottoms against the shoulder 52, at which time further inward travel of the valve body 58 within the annular member 36 will be prevented. Notwithstanding the movability of the valve body 58 within the annular member 36, as described, leakage of fluid around the valve body is prevented by providing an organic O-ring 70 therebetween, the O-ring 70 being retained in an annular recess 72 in the outer surface of the valve body 58. The O-ring 70 also permits the annular body 58 to somewhat axially misalign itself with respect to the annular member 32 without breaking the fluid seal therebetween. This is useful in permitting the coupling of the elements 30, 32 when there is up to approximately ±0.015 in. misalignment for a coupling of the type described.

The annular valve body 58 is positively retained within the annular member 36 by a double-ended metallic annular retainer 74 which is retained within an annular recess 76 in the larger internal diameter portion 48 of the annular member 36. The retainer 74 is positioned so that it engages a frustoconical portion 78 in the outer surface of the annular member 58 at the maximum desired outer limit of the travel of the valve body 58 relative to the annular member 36.

Fluid flow within the female coupling element 32 is controlled by a valve 80 which is slidable to and fro within the valve body 58. The valve 80 has a cylindrical outer portion 82 which fills a substantial portion of the length of the smaller diameter portion 64 of the valve body 58 when the female coupling element 32 is in its free, uncoupled state, as shown in FIG. 2. Thus, with the aid of an organic O-ring 84, which is positioned within an annular recess 86 in the smaller diameter portion 64 of the valve body 58 and which slidably engages the outer surface of the outer portion 82 of the valve 80, no fluid will flow between the valve 80 and the valve member 58 in the free or uncoupled state of the female coupling element 32. In that regard, it is noted that the valve 80 is resiliently biased toward its FIG. 2, free or uncoupled state by a coil spring 86 which is trapped between the inside of the restricted opening 54 of the annular member 36 and an enlarged end portion 88 of the valve 80. The enlarged end portion 88 is circumferentially interrupted by a plurality of longitudinally extending, spaced apart recesses 90 to permit fluid flow past the valve 80 when the coupling element 32 is away from its FIG. 2 free or uncoupled state. However, the valve 80 is prevented from exiting the valve body 58 under the influence of the spring 86 by the bottoming of a circumferentially interrupted, frustoconically shaped surface portion 92 on the outer surface of the valve 80 against the frustoconically shaped portion 68 on the inside of the valve body 58. As shown, the frustoconical surface portion 92 of the valve 80 is positioned between, and joins, the end portion 88 and the cylindrical portion 82 of the valve 80.

The male coupling element 30 includes an outer annular member 100 with an externally threaded portion 102 to permit an inner end 104 of the annular member 100 to be threadably secured to a fitting, not shown, within a card 10. The annular member 100 may be sealed with respect to an opening, not shown, in the card 10 by providing the annular member 100 with a reduced diameter portion 96 and a nitrile O-ring 98 in the reduced diameter portion 96.

The annular member 100 has a substantially uniform internal diameter 106 which extends substantially between its inner end 104 and its outer end 108, the inner end 104 itself being provided with a restricted opening 110 of short axial length by swaging or otherwise inwardly deforming a terminal portion 112 of the annular member 100. A perforate annular retainer 114 is positioned within the annular member 110 near the inner end 104, and an annular valve sleeve 116 is positioned within the annular member 110 near the outer end 108 thereof. The annular valve sleeve 116 has a large diameter end portion 118 which slidably engages the internal diameter 106 of the annular member 100 and a reduced diameter end portion 120 which extends beyond the end 68 of the annular member 100. A coil spring 122 is trapped between the annular valve sleeve 116 and the perforate annular retainer 114 to resiliently urge such elements away from one another. Further, an organic O-ring 124 is positioned in an annular recess 126 in the internal diameter 106 of the annular member 100 to prevent fluid leakage between the larger diameter portion 118 of the annular valve sleeve 116 and the internal diameter 106 of the annular member 100 as the annular valve sleeve 116 moves to and fro within the annular member 100.

The male coupling element 30 further comprises an elongate valve number 130 positioned along its longitudinal central axis. The valve number 130 has a reduced diameter central portion 132, a generally frustoconical enlarged end portion 134 which extends beyond the free end of the reduced diameter portion 120 of the annular valve sleeve 116, and an enlarged opposed end portion 130 with a stepped down free end 138 which snugly seats within an annulus in the perforate annular retainer 114 to ensure that the valve member 130 and the annular sleeve 116 will move in unison. The end portion 134 of the valve member 130 has an annular recess 140 therein, and the annular recess 140 has an organic O-ring 142 therein which seats against the free end of the reduced diameter portion 120 of the annular valve sleeve 116 in the free or uncoupled state of the male coupling element 30, as shown in FIG. 2, to block all fluid flow from the outer end 68 of the annular member 100.

Figure 4:
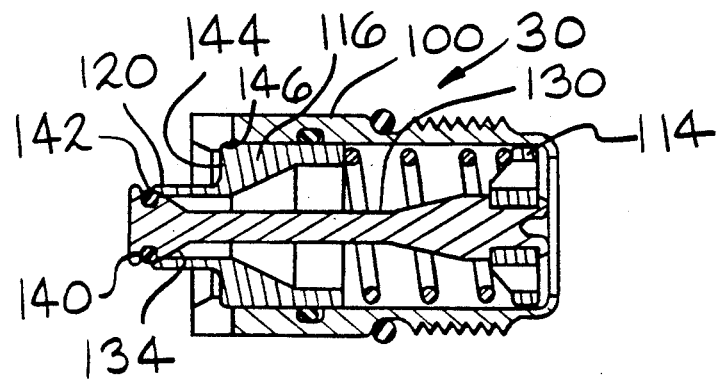
FIG. 4 is a view similar to FIGS. 2 and 3 of the male coupling element of the present invention with its components arranged in a first pressure relieving condition.

As is clear from FIG. 2, in the normal free or uncoupled state of the male coupling element 30 there will be a space of finite distance along the longitudinal central axis of the coupling element 30 between a radial shoulder 144 on the annular valve sleeve 116, at the juncture of the larger diameter portion 118 and the reduced diameter portion 120 thereof, and a radial shoulder 146 on the inside of the annular member 100 near the outer end 68 thereof. A condition of excess fluid pressure within the coupling element 30 will cause the annular valve sleeve 116 to move toward the free end 68 of the annular member 100, until the shoulder 144 engages the shoulder 146, a condition which is illustrated in FIG. 4. This will increase the internal volume of the coupling element 30 which is available to contain liquid, and thereby tend to relieve the condition of excessive fluid and the condition of excessive pressure within the coupling element 30 and the portions of the liquid flow system which are in communication with it. In the FIG. 4 condition of the coupling element 30, the valve number 130 will be moved to the left by virtue of the engagement of the portion 134 of the valve number 130 and the free end of the reduced diameter portion 120 of the valve sleeve 116. In turn, this will draw the perforate annular retainer 114 away from the inner end 104 of the annular member 100 by virtue of the engagement between the free end 138 of the valve number 130 and the annular retainer 114. The annular valve sleeve 116 will be free to return to its FIG. 2 position when the condition of excessive pressure is relieved, for example by the cooling of the fluid within the coupling element 30 and the line leading thereto, an event which will develop a negative pressure within the coupling element 30.

Figure 5:
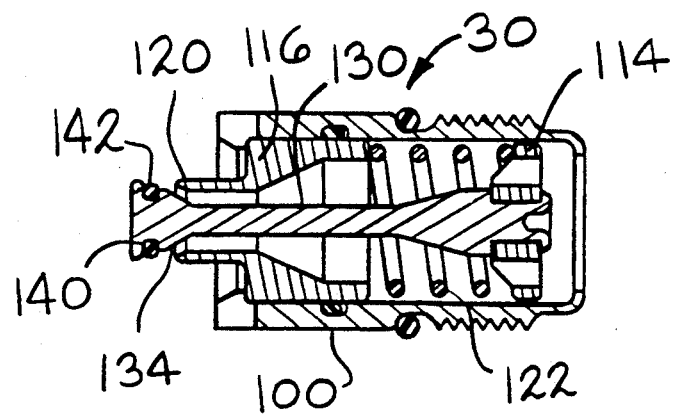
FIG. 5 is a view similar to FIG. 4 of the male coupling element of the present invention with its components arranged in a second pressure relieving condition.

If the condition of excessive pressure within the male coupling element 30 continues beyond that which can be relieved by the movement of the valve sleeve 116 from its FIG. 2 position to its FIG. 4 position, the pressure will tend to move the valve member 130 and the annular retainer 114 further to the left, thereby partly compressing the spring 122 and breaking the seal between the O-ring 142 and the free end of the reduced diameter portion 120 of the valve sleeve 116. This condition, which is illustrated in FIG. 5, will permit liquid within the coupling element 30 to be dumped, until such time as the liquid pressure within the coupling element falls below that required to overcome the biasing effect of the spring 122, at which time the spring 122 will tend to move the annular retainer 114 to the right, to its FIG. 4 position, which will reestablish a seal between the O-ring 142 and the free end of the reduced diameter portion 120 of the valve sleeve 116.

As is clear from a comparison of FIGS. 2 and 3, a flow path for liquid from the coupling element 30 to the coupling element 32 is established when the coupling elements 30, 32 are connected, by the movement of the annular valve sleeve 116 of the coupling element 30 to the right, against the biasing effect of the spring 122, by virtue of its engagement with the end 62 of the annular valve body 58 of the coupling element 30, and by the movement of the valve 80 of the coupling element 32 to the left, against the biasing effect of the spring 86, by virtue of the engagement of the free end of the valve 80 by the end portion 34 of the valve member 130. In this condition of the coupling elements 32, 30, the O-ring 84 of the coupling element 32 will sealingly engage the outer surface of the reduced diameter portion 120 of the annular valve sleeve 116 to prevent fluid flow therebetween.

Although the best mode contemplated by the inventor(s) for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. A coupling for a fluid line, said coupling comprising first and second coupling elements coupled together to permit fluid to flow in series through said coupling elements, said first coupling element comprising:

a first annular member, said first annular member having a larger diameter portion extending inwardly from a first end thereof, a reduced diameter portion extending substantially from a second end thereof to said larger diameter portion, a first transversely extending annular shoulder at a juncture between said larger diameter portion and said reduced diameter portion, said first annular shoulder extending outwardly from said reduced diameter portion, and a second transversely extending annular shoulder adjacent said second end thereof said second annular shoulder extending inwardly from said reduced diameter portion;

an annular valve body positioned within said larger diameter portion of said first annular member, said annular valve body being slidable within said first annular member and being in a position where an end of said annular valve body is in engagement with said first shoulder, said annular valve body further having an opposed end which extends outwardly beyond said first end of said first annular member, said annular valve body further having on its inside surface, between its end and its opposed end, a surface portion which tapers inwardly as it extends toward said opposed end;

a valve, said valve having a first end and an opposed end, said first end being generally cylindrical, said opposed end being larger in radial extent than said first end and having longitudinally extending slot means extending therethrough, said valve further having a tapered surface between said first end and said opposed end, said tapered surface tapering inwardly as it extends toward said first end, said valve being moveable within said annular valve body and being in a position where said first end is positioned inwardly of said opposed end of said valve body, said tapered surface of said valve being out of engagement with said surface portion of said annular valve body in said first position of the valve; and spring means trapped between said second annular shoulder of said (first annular member and said opposed end of said valve, said spring means resiliently urging said valve toward said second coupling element;

said second coupling element comprising:

a second annular member having a first end with a restricted opening and a second end with a restricted opening, said second end of said second annular member being adjacent to said first end of said first annular member;

a perforate retainer, said perforate retainer being slidably positioned within said second annular member, said perforate retainer being adjacent said first end of said second annular member;

an annular valve sleeve, said annular valve sleeve having a larger diameter portion which is slidably positioned within said annular member, a reduced diameter portion which extends from said larger diameter portion toward said second end of said second annular member and a generally transversely extending shoulder at a juncture between said larger diameter portion and said smaller diameter portion, said shoulder of said annular valve sleeve being in engagement with a free end of said annular valve body of said first coupling element;

spring means trapped between said perforate annular retainer and said annular valve sleeve for resiliently urging said annular valve sleeve toward said first coupling element; and an elongate valve member having a first end affixed to said perforate retainer and a second end extending beyond said reduced diameter portion of said annular valve sleeve, said elongate valve member engaging a free end of said first end of said valve to keep said first end of said valve from blocking fluid flow through said opposed end of said annular valve body.

2. A coupling according to claim 1 wherein said second coupling element further comprises:
O-ring sealing means between the outside of said larger diameter portion of said annular valve sleeve and the inside of said second annular member to prevent fluid flow between said annular valve sleeve and said second annular member and permit limited axial misalignment between said annular valve sleeve and said second annular member without permitting fluid flow therebetween.

3. A coupling according to claim 2 wherein said first coupling element and said second coupling element are substantially coaxial with one another.

4. A coupling according to claim 3 wherein said first coupling element further comprises:
second O-ring sealing means between the outside of said larger diameter portion of said annular valve sleeve and the inside of said first annular member to prevent fluid flow between said annular valve sleeve and said first annular valve member.

5. A coupling according to claim 4 and further comprising:
third O-ring sealing means positioned between the inside of the opposed end of said annular valve body of said first coupling element and the outside of the reduced diameter portion of said annular valve sleeve of said second coupling element, said third O-ring sealing means blocking fluid flow between said annular valve body of said first coupling element and said annular valve sleeve of said second coupling element.

6. A coupling according to claim 5 wherein said first coupling element further comprises:
annular recess means on the inside of the opposed end of said annular valve body of said first coupling element, said annular recess means engaging and retaining said third O-ring sealing means.

7. A first coupling element for a fluid line coupling comprising, in combination, an annular member having an inner end adapted to be connected to a normally substantially unpressurized fluid circuit, an outer end adapted to be connected to a second coupling element, and an axial cylindrical bore intersecting each end, a valve subassembly axially displaceable with said member bore between an inner position defining a closed minimum volume chamber within said bore and an outer position defining a closed maximum volume chamber within said bore, said valve subassembly comprising an elongated axially related valve stem having an inner end and an enlarged circular outer end having a valve seat defined thereon, a tubular valve sleeve circumscribing and axially displaceable with respect to said valve stem having an outer cylindrical surface of a diameter slightly less than the bore diameter, an outer end, and a through axial passage intersecting said valve sleeve outer end to define an annular valve sleeve port, said valve sleeve port having a diameter less than that of said stem head whereby upon engagement of said sleeve port with said stem head and valve seat outer axial displacement of said valve sleeve with respect to said stem is terminated and said member bore is sealed, and a spring axially displaceable with said subassembly and axial biasing said valve sleeve toward said stem head, an inner abutment defined on said member, an outer abutment defined on said member axially spaced from said inner abutment, a first abutment defined on said valve subassembly adapted to engage said member inner abutment at said subassembly inner position, a second abutment defined on said valve sleeve adapted to engage said member outer abutment at said subassembly outer position, the axial distance separating said member's inner and outer abutments being greater than the axial distance separating said subassembly first and second abutments permitting axial displacement of said subassembly within said member bore between its inner and outer positions while said subassembly stem valve seat and sleeve port are engaged, and an annular seal ring interposed between said member bore and valve sleeve cylindrical surface sealing said valve sleeve with respect to said member bore and providing a frictional restraint on said valve sleeve against axial displacement less than the axial biasing force of said spring upon said valve sleeve, said frictional restraint being overcome upon said subassembly being axially displaced between said inner position to said outer position.

8. In a first coupling element as in claim 7, a perforate retainer mounted on said stem inner end, said spring comprising a compression spring interposed between said valve sleeve and said retainer.

9. In a first coupling element as in claim 7, said member inner and outer abutments comprising radial shoulder surfaces defined on said member, and said second abutment comprises a radial shoulder defined on said valve sleeve.

10. In a first coupling element as in claim 7, an annular resilient seal mounted on said valve stem head comprising at least a portion of said valve seat.

11. In a first coupling element as in claim 7, an annular groove defined in said member intersecting said bore, said annular seal ring comprising a resilient O-ring received within said groove.

12. In a first coupling element as in claim 7, said valve stem head including a pressure face exposed to pressurized medium within said maximum volume chamber, said stem being axially displaced outwardly from said valve sleeve port upon the axial pressure exerted upon said pressure face becoming greater than the biasing force of said spring to release pressurized medium from said maximum volume chamber.

13. A liquid-cooled preprogrammed card for an electronic system, the card having at least one connection for the flow of a liquid cooling medium into or out of the card, said at least one connection having a coupling element of a quick disconnect coupling attached thereto, said coupling element comprising, in combination, an annular member having an inner end adapted to be connected to a card circuit wherein the card circuit is normally substantially unpressurized when the card is removed from the electronic system, an outer end adapted to be connected to a second coupling element, and an axial cylindrical bore interacting each end, a valve subassembly axially displaceable with said member bore between an inner position defining a closed minimum volume chamber within said bore and an outer position defining a closed maximum volume chamber within said bore, said valve subassembly comprising an elongated axially related valve stem having an inner end and an enlarged circular outer end having a valve seat defined thereon, a tubular valve sleeve circumscribing and axially displaceable with respect to said valve stem having an outer cylindrical surface of a diameter slightly less than the bore diameter, an outer end, and a through axial passage intersecting said valve sleeve outer end to define an annular valve sleeve port, said valve sleeve port having a diameter less than that of said stem head whereby upon engagement of said sleeve port with said stem head and valve seat outer axial displacement of said valve sleeve with respect to said stem is terminated and said member bore is sealed, and a spring axially displaceable with said subassembly and axial biasing said valve sleeve toward said stem head, an inner abutment defined on said member, an outer abutment defined on said member axially spaced from said inner abutment, a first abutment defined on said valve subassembly adapted to engage said member inner abutment at said subassembly inner position, a second abutment defined on said valve sleeve adapted to engage said member outer abutment at said subassembly outer position, the axial distance separating said member's inner and outer abutments being greater than the axial distance separating said subassembly first and second abutments permitting axial displacement of said subassembly within said member bore between its inner and outer positions while said subassembly stem valve seat and sleeve valve port are engaged, and an annular seal ring interposed between said member bore and valve sleeve cylindrical surface sealing said valve sleeve with respect to said member bore and providing a frictional restraint on said valve sleeve against axial displacement less than the axial biasing force of said spring upon said valve sleeve, said frictional restraint being overcome upon said subassembly being axially displaced between said inner position to said outer position.

14. In a liquid-cooled preprogrammed card for an electronic system as in claim 13, a perforate retainer mounted on said stem inner end, said spring comprising a compression spring interposed between said valve sleeve and said retainer.

15. In a liquid-cooled preprogrammed card for an electronic system as in claim 13, said member inner and outer abutments comprising radial shoulder surfaces defined on said member, and said second abutment comprises a radial shoulder defined on said valve sleeve.

16. In a liquid-cooled preprogrammed card for an electronic system as in claim 13, an annular resilient seal mounted on said valve stem head comprising at least a portion of said valve seat.

17. In a liquid-cooled preprogrammed card for an electronic system as in claim 13, an annular groove defined in said member intersecting said bore, said annular seal ring comprising a resilient O-ring received within said groove.

18. In a liquid-cooled preprogrammed card for an electronic system as in claim 13, said valve stem head including a pressure face exposed to pressurized medium within said maximum volume chamber, said stem being axially displaced outwardly from said valve sleeve port upon the axial pressure exerted upon said pressure face becoming greater than the biasing force of said spring to release pressurized medium from said maximum volume chamber.

19. In a coupling consisting of first and second tubular elements adapted to be interconnected to permit fluid flow therebetween wherein the first coupling includes a spring biased self sealing valve and the second coupling includes a tubular protuberance engaging the valve of the first coupling during connection to displace and open the valve, the improvement comprising, the second coupling having an open end through which the protuberance extends, a cylindrical recess defined in the second coupling having an axis and intersecting said open end, the tubular protuberance including an inner end received within said recess, said inner end being of a lesser diameter than said recess and axially tiltable with respect to the axis of said recess, a resilient O-ring interposes between said recess and protuberance inner end biasing said inner end toward a coaxial relationship with said recess axis and retaining means mounted on the second coupling retaining said inner end within said recess and permitting tilting of the protuberance for self alignment with the first coupling.

20. In a coupling as in claim 19, said protuberance inner end including an innermost portion of significantly lesser diameter than the diameter of said recess and an outermost portion of a diameter slightly less than the diameter of said recess whereby said outermost portion comprises a fulcrum, said O-ring being mounted upon said innermost portion.

21. In a coupling as in claim 20, said retaining means comprising a ring mounted on the second coupling concentric to said recess axis and radially projecting inwardly of the recess and engaging said inner end outermost portion intermediate said outermost portion and the second coupling open end.

* * * * *